United States Patent [19]
Burns et al.

[11] Patent Number: 5,129,605
[45] Date of Patent: Jul. 14, 1992

[54] RAIL VEHICLE POSITIONING SYSTEM

[75] Inventors: Roger D. Burns; Susan Elliott-Bryan, both of Cedar Rapids, Iowa; David B. Turner, Los Angeles, Calif.

[73] Assignee: Rockwell International Corporation, Seal Beach, Calif.

[21] Appl. No.: 584,231

[22] Filed: Sep. 17, 1990

[51] Int. Cl.5 .............................. B61L 25/02
[52] U.S. Cl. ........................ 246/5; 246/122 R
[58] Field of Search .............. 246/25, 3, 4, 5, 122 R, 246/167 D, 168.1; 364/436, 449, 450; 342/450, 454, 456, 457

[56] References Cited

U.S. PATENT DOCUMENTS

| | | | |
|---|---|---|---|
| 3,940,597 | 2/1976 | DiMatteo | 342/456 X |
| 4,027,840 | 6/1977 | Blair | 246/122 |
| 4,071,282 | 1/1978 | Callahan et al. | 246/168.1 X |
| 4,361,301 | 11/1982 | Rush | 246/34 |
| 4,711,418 | 12/1987 | Aver, Jr. et al. | 246/5 |
| 4,768,740 | 9/1988 | Corrie | 246/122 R X |
| 4,894,662 | 1/1990 | Counselman | 342/450 X |
| 4,899,285 | 2/1990 | Nakayama et al. | 364/449 X |
| 4,903,212 | 2/1990 | Yokouchi et al. | 364/449 |
| 4,924,402 | 5/1990 | Ando et al. | 364/449 |
| 4,989,151 | 1/1991 | Nuimura | 364/449 |

FOREIGN PATENT DOCUMENTS

| | | | |
|---|---|---|---|
| 2611868 | 10/1976 | Fed. Rep. of Germany | 246/122 R |
| 126317 | 10/1979 | Japan | 246/5 |

Primary Examiner—Frank E. Werner
Assistant Examiner—Scott L. Lowe
Attorney, Agent, or Firm—Gregory G. Williams; M. Lee Murrah; H. Fredrick Hamann

[57] ABSTRACT

A rail vehicle positioning system having a plurality of inputs used to generate a position report including a GPS receiver, a wheel tachometer, O.S. circuits, transponders, and manual inputs from locomotive engineers.

11 Claims, 2 Drawing Sheets

RAIL VEHICLE POSITIONING SYSTEM

FIELD OF THE INVENTION

The present invention relates to positioning systems for rail vehicles and more particularly, concerns rail vehicle positioning systems which utilize a combination of positioning sources such a global positioning systems (GPS) technology, trackside transponders, track circuits and wheel tachometer inputs.

BACKGROUND OF THE INVENTION

In the past, rail vehicle positioning has been accomplished in two predominant manners. The traditional vehicle positioning system has used embedded track circuits which are insulated or electrically isolated sections of track with a voltage applied at one end, which are shunted by a vehicle and indicate that a vehicle is located at a certain segment of the track. Such a system is described in U.S. Pat. No. 4,361,301 entitled, "Vehicle Train Tracking apparatus and Method" and was issued to Donald G. Rush on Nov. 30, 1982, which is incorporated herein by this reference. Another improved system, has included dead reckoning with wheel tachometer readings which are corrected by trackside transponder units. Such a system is described in U.S. Pat. No. 4,027,840 entitled, "Vehicle Position Indicator with Radar Interrogation Each of Spaced Transponders Disposed Along Pathway for the Vehicle", which was issued to Peter Kenneth Blair on June 7, 1977, which is incorporated herein by this reference.

While these systems, or variations of them, have enjoyed use in the past, they each have several serious drawbacks. The traditional embedded track circuit method has as a weakness, because it provides low resolution of position typically one or more miles. Also, there is no way to distinguish whether one or more trains are occupying the same track segment. The trackside transponder (or indicator) and wheel tachometer dead reckoning method has problems, because the wheel slip, between the locomotive wheel and the rail, causes uncertainty in the accuracy of the wheel tachometer. The ability to provide accurate position is also a function of the number of the expensive trackside transponders that are used.

The inability to continuously ascertain the precise location of a train on a rail network results in an inefficient use of the track resources because the dispatching, routing, or authorization of trains on a particular track is often delayed until all uncertainties of train locations about the network are resolved.

Consequently, there exists a need for improvement in rail vehicle positioning systems which have a high degree of accuracy while concomitantly reducing the need for trackside transponders.

SUMMARY OF THE INVENTION

It is an object of the present invention to provide a highly accurate rail vehicle positioning system.

It is a feature of the present invention to use a combination of sources including GPS technology, trackside transponders, track circuits and wheel tachometer readings to perform position determination.

It is an advantage of the present invention to provide position information over a wide geographic area without requiring trackside transponders over the entire length of track.

The present invention provides a rail vehicle positioning system which is designed to fulfill the aforementioned needs, satisfy the earlier propounded objects, contain the above described features and produce the previously stated advantages. The invention is carried out in a "trackside transponder-less" fashion, in the sense that the large numbers of trackside transponders which would be necessary if they were the sole source of position determination are substantially reduced along a large majority of the track length. Instead, the rail vehicle positioning system, utilizes a multiplicity of sources including track circuits, transponders, and GPS data to update the wheel tachometer and further uses GPS data to affect wheel tachometer calibrations.

Accordingly, the present invention relates to a rail vehicle positioning system which includes a GPS receiver, a reduced number of trackside transponders (or no trackside transponders), track circuits, a wheel tachometer and a computer which calibrates the wheel tachometer where available using GPS data and further performs a dead reckoning function.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
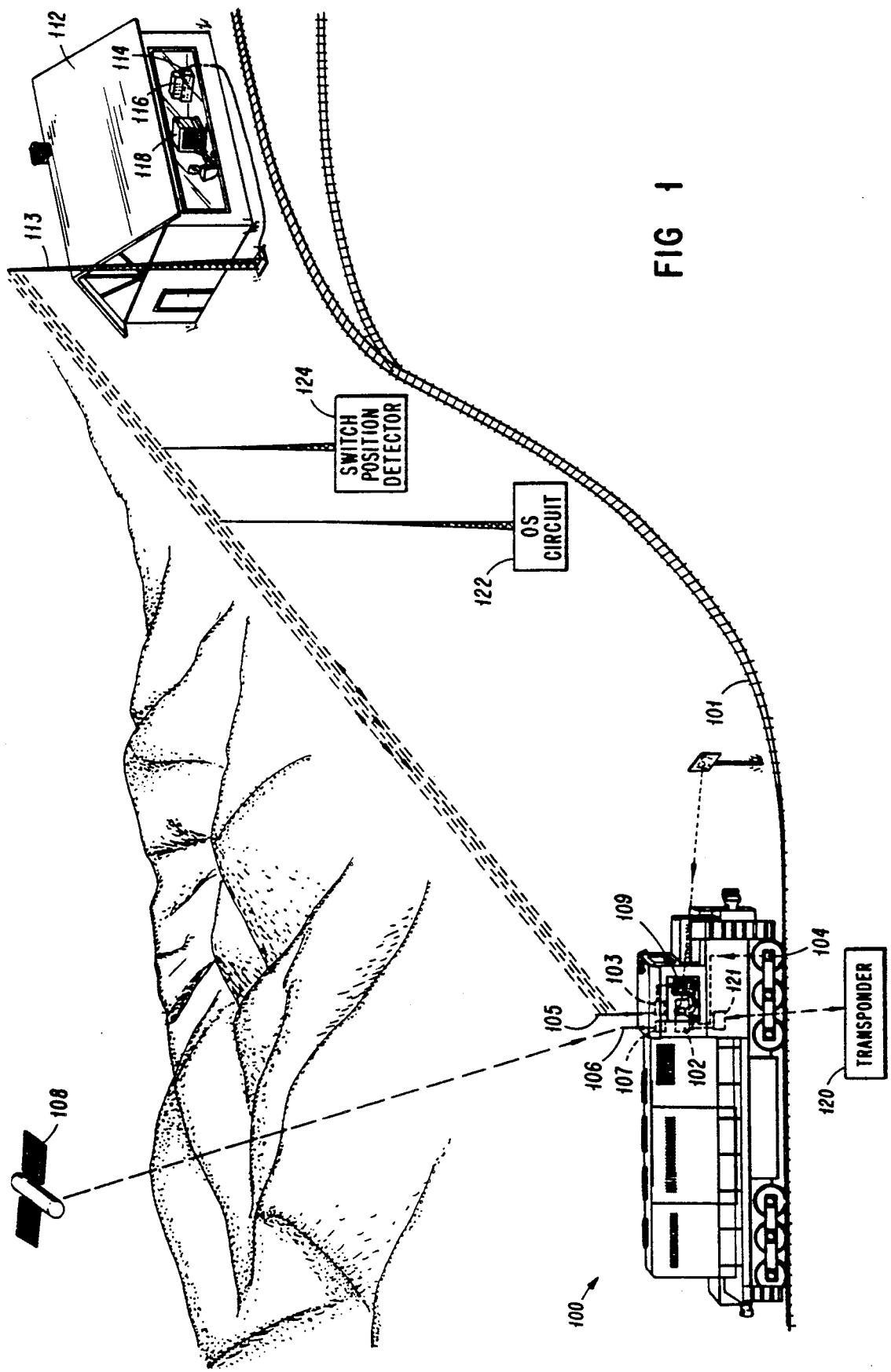
FIG. 1 is a schematic representation of the rail vehicle positioning system in its intended environment.

Now referring to the drawings, and more particularly to FIG. 1, there is shown a first locomotive, generally designated 100, on a first rack 101. Locomotive 100 is shown having a Train Control Computer (TCC) 102 which is coupled with train/base radio 103 having antenna 105. TCC 102 is preferably a microprocessor controlled digital computer, capable of performing numerous variable functions, which are necessarily variable to accommodate different locomotive types, radio systems, trackside transponders and etc., all of which are to some extent a matter of the system designer preference. Train/Base Radio 103 is preferably a communication system that is capable of transmitting and receiving data signals at a relatively high data rate. Train Control Computer (TCC) 102 is also coupled with wheel tachometer 104, or the like, and the combination of GPS antenna 106 and receiver 107. GPS satellite 108 is schematically shown transmitting a signal. (Note—several GPS satellites would typically be transmitting signals to a covered area at any given time)

Train Situation Indicator (TSI) 109 is coupled with TCC 102 and is preferably an interactive display device for both receiving information from and displaying information to a train crew member. TSI 109 may be either a touch screen display device for both displaying information and receiving information or it may be bifurcated into separate components including one means for displaying and another means for receiving manual input of information, both of which are well known in the art. OS circuit 122 and switch position detector 124 are preferably RF coupled through antenna 105 and radio 103 to TCC 102 and through base antenna 113 and base radio 114 to base control computer (ROCS) 116, which is preferably coupled with dispatchers console 118. Transponder 120 is coupled by transponder interrogator 121 to TCC 102. OS Circuit 122 and detector 124 may also be only coupled indirectly to TCC 102 and directly to only base radio 114 and ROCS 116. ROCS 116 is preferably a computer, similar to TCC 102 which is capable of performing numerous variable functions, which are necessarily variable to accommodate different locomotive types radio systems, trackside indicators and etc., all of which are to some extent a matter of the system designers preference.

In operation, the rail vehicle positioning system operates by the TCC 102 receiving GPS signals, from satellite 108, together with wheel tachometer signals, from wheel tachometer 104, and transmitting this information by train/base radio 103, back to the base antenna 113 at the base station 112 where the data is manipulated by ROCS 116 in a manner similar to that discussed below, and retransmitted back to radio 103 and possibly, if desired to any other radio on any other locomotives, (not shown). However, the data manipulation can also be performed in the TCC 102. It is understood that through this description, that all functions performed by ROCS 116 or TCC 102 may be performed by either ROCS 116 or TCC 102. The degree of duplication between functions performed by the ROCS 116 and TCC 102 and the and the degree of separation of such functions is a matter of designers choice for the particular needs and wants of any particular customer.

Figure 2:
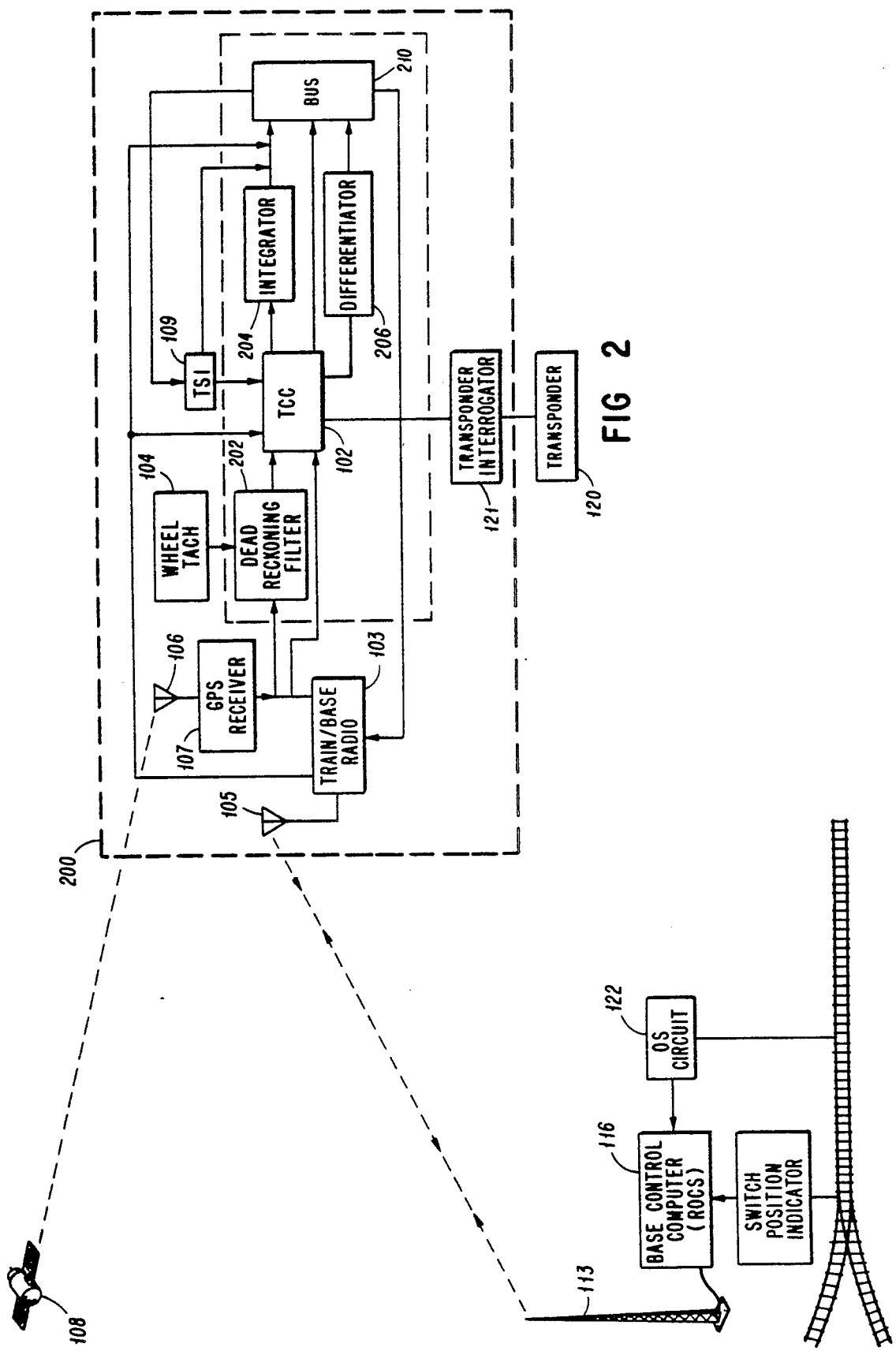
FIG. 2 is a diagram of the apparatus and method in which information is utilized, on and off board the rail vehicle, in its position determining function.

A more detailed understanding of the position determining function of the present invention can be achieved by referring to FIG. 2, where like numbers and matter refer to like numbers and matter of FIG. 1 and their accompanying text.

FIG. 2 depicts a system and method, of the present invention, which results in a position report, which is preferably divided into a GPS data block and a dead reckoning data block. Exterior dashed line 200 represents the equipment on board the locomotive 100 (FIG. 1). The interior dashed line represents equipment and functions which could all be performed by TCC 102. Wheel tachometer 104 generates pulses which are used by the dead reckoning filter 202 to determine speed. Dead reckoning filter 202 is preferably a process performed by TCC 102 which compares velocity and position data, and rejects inconsistent data. GPS receiver 107 also generates a speed and position signal which is input to the TCC 102 to indicate position and speed, and also to calibrate the wheel tachometer 104. GPS receiver 107 also inputs a speed signal into TCC 102. The TCC 102 determines the best source of speed signal. In making such determinations the GPS speed is generally preferred when it is greater than 10 miles per hour or when wheel slip is detected; otherwise, CPS calibrated wheel tach 104 speed is used. TCC 102 routes this best speed signal to integrator 204, differentiator 206 and to bus 210. The integrator 204 determines distance traveled by integrating the speed signal output from TCC 102. Integrator 204 outputs a distance signal which can be compared in TCC 102, with a distance signal input from the locomotive engineer at the TSI 109 or with distance signals from an OS circuit 122 or a transponder 120 to provide a more accurate distance signal. The differentiator 206 determines acceleration by differentiating the speed signal output from the TCC 102. Integrator 204 and differentiator 206 can be performed by numerous devices and methods which are generally known and are commercially available. The values of speed, distance and acceleration constitute the dead reckoning data block of the position report. The sign of the speed indicates direction of travel with respect to the train route as defined by the origin and destination of the train. The GPS block of the position report contains position, velocity, speed, heading, and time. The position report generated by the TCC 102 is transmitted by train/base radio 103 to base station 112. Base station 112 is preferably where a dispatcher has direct access to dispatcher's console 118 and train/base radio 103.

In operation, the rail vehicle positioning system, of the present invention, is initialized as follows. The dead reckoning data block, discussed above, represents distance from a defined point in the ROCS 116 or TCC 102 database constituting the trains route. When initializing the train position at the start of a trip, the ROCS 116 or TCC 102 determines the initial location of the train, either automatically or manually, i.e. from input by the locomotive engineer at the TSI 109 in terms of distance on the first segment of the route. Segment distance refers to the method of representing location on a track. The segment is a section of unbranched track (not including sidings). Points on a segment are preferably measured in distance from the east end starting with zero. This initial distance is received by the TCC 102 and subsequent TCC 102 generated distances are directly related to route distance from that point. Route distance herein refers to the ever increasing distance accrued on a single trip, i.e., since the initialization of the TCC 102.

After initializing the train position at the start of a trip, two methods are used to correct the TCC's calculation of position. First of all, ROCS 116 or TCC 102 has accurate train position when the GPS data block is being received in the position report. GPS derived position is translated in ROCS 116 or TCC 102 to route distance. At periodic intervals, ROCS 116 may send a time tagged distance value corresponding to GPS derived position to the TCC 102. Alternately, the TCC 102 can independently generate such a time tagged distance value corresponding to GPS derived position. The TCC 102 uses this input as a correction to its next dead reckoned data block report and flags it as corrected. Because GPS speed is being simultaneously sued by the TCC 102 as a basis of its calculations, these corrections are expected to be of small magnitude.

In the absence of GPS, ROCS 116 or TCC 102 uses the well known central train control (CTC) generated OS passage indications to determine known positions of the train in sections of track so equipped. ROCS 116 or TCC 102 similarly translate this to route distance. Because in this case, wheel tach 104 is the only source of speed for the TCC 102, with its attendant problems of slip and calibration, and because OS reports are relatively infrequent, these corrections may be of significant magnitude.

Secondly, the TSI 109 provides a mechanism by which the locomotive engineer can input current location in terms of mile post. The TSI 109 preferably contains a database which allows it to translate the mile post location to distance along the train's route and then sends it to the TCC 102 which uses it to correct the next dead reckoning data block.

The onboard display, TSI 109, is driven by the TCC 102 distance output. To display train position, the TSI 109 uses a database to translate route distance to location on the route and can therefore show the train moving along in reference to geographical features and mile posts stored in the data base. The database is uploaded from ROCS 116 or TCC 102 and defines the route, which is a concatenation of track segments over which the train is expected to travel. In a case where the entire route is unknown at initialization, the TSI 109 can still support the display of train movement if it receives from ROCS 116 or TCC 102, an indication of direction of travel on the first segment. In this case, ROCS 116 or TCC 102 must send a timely message later which includes additional route information.

In ROCS 116, vehicle position reports are being received at a rate preferably based upon the speed of the vehicle. Also, ROCS 116 can determine when to expect the next report by looking at the speed value in the current report. ROCS 116 and TCC 102 evaluates each input for reasonable consistency with previous reports and other applicable reports, and accepts or rejects it as appropriate. Additionally, trackside transponders are showing progressive movement along tracks. It is in ROCS 116 or TCC 102 that the various sources of information are integrated to create a unified, consistent picture of traffic and traffic flow.

A necessary and crucial step in creating the consistent picture of traffic flow is resolving ambiguities between the information from the various sources. An early component of this resolution of ambiguities is validation of the information from the several sources. Another step is correction of the sources when possible. Finally, it is necessary to have a prioritization of sources.

For example, GPS data reports, once determined to have arrived over the datalink uncorrupted, undergo the following tests:

1. The three dimensional position is mapped on a tangent plane defined for the region.
2. The database is searched for a track segment, the end points of which, bracket the GPS position and for which the cross-track error is less than some maximum which depends on figure of merit (FOM) and depth of curve. If no track segment is found which meets these conditions, then the position report is rejected.
3. Distance along the track is determined by interpolating between points stored and the database for the track segment.
4. The new train location is checked for reasonableness against the previously accepted position, taking into account reported velocity, maximum velocity and physical acceleration limits. Any report rejected at this point is saved for future reference.
5. The direction of travel is established or confirmed by using the velocity vector in the tangent plane. A report passing all tests is accepted and stored as a position fix for the vehicle. Position fix refers to the location a vehicle is known to have achieved according tot he last position report which was accepted as uncorrupted and reasonable, and was unambiguously assigned to a vehicle. When the train length is known, an end of train position is also stored at this time.

When a train position report is received in ROCS 116 with no valid GPS block in it, then the distance is taken from the dead reckoning data block portion of the position report. Reasonableness checks similar to the above checks for GPS data reports are performed, and if accepted, the report is stored as a position fix for the vehicle.

Dead reckoning data blocks, of the position reports, which are flagged to indicate corrected data, may fall the reasonableness test but are stored for further reference in subsequent reasonableness tests.

Train position reports, including both GPS data block and dead reckoning data block, provide an acceptable and precise along-the-track position, but neither one can indicate which of parallel tracks the train is on. Transponder indicators, track occupancies, switch positions train crew entries and manual dispatcher entries are also used to resolved these ambiguities.

While GPS is available, it is preferred that no other source of position information is used to generate a position fix, though they may be used to resolved ambiguities. In the absence of GPS and for non-reporting vehicles, any of the other sources (dead reckoning, transponder, OS circuits, dispatcher entry, etc.), once accepted as reasonable and assigned to a vehicle, are stored as a position fix for that vehicle. When a vehicle is reporting dead reckoning position only, successive track occupancy indications are used to validate the direction of travel indicated by the dead reckoning data blocks. This reduces the time to recognize an error in locomotive switch settings which drive the TCCs sense of direction. The correction sent to the TCC, when a direction error is noted, causes the TCC to reverse its directional logic.

When transponders are available, but GPS is not, transponders are preferred for the fix.

When GPS is not available and the train is in a territory where no track circuits and no transponders are present to aid in confirmation of direction, ROCS 116 shall prompt the dispatcher to confirm manually, or preferably TCC 102 shall prompt the locomotive engineer to confirm manually.

Also track occupancies and OS reports are used to track non-equipped vehicles, and OS reports are used to correct dead reckoning distance and OS entries when GPS is unavailable. Additionally, track circuits around a switch are used to verify that a train has cleared the main at a turnout. When no train generated reports are available, best estimate of speed is derived by averaging time between OS reports.

Manual entry of position made by the dispatcher is required in dark territory for non-reporting trains, for correcting dead reckoning distance when GPS is unavailable, and for resolving ambiguities where switch position is unknown. The entry is assumed to be correct, although, it is subjected to gross reasonable tests and the dispatcher is prompted to verify the entry if it fails these tests.

ROCS 116 maintains current best estimate of position for all trains through a dead reckoning calculation based on last reported speed and direction, known speed restrictions, train acceleration parameters, and commanded pacing speeds. The best estimate of position (BEOP) is preferably updated at a minimum of once every two minutes and is preferably set to agree to new position fixes. This allows the display function to show both the last known position of the end of the train and the estimated (probable) position of the front of the train at any time.

The position of track maintenance forces is preferably based on GPS reports from the vehicle or manual dispatcher entry (or possible track circuit transponders). Special consideration is made for those vehicles which can be off the track. The threshold for off-track error may be greater than for trains so as to assume the worst case (on track causes potential hazard). When dealing with nearby train traffic, the dispatcher will confirm verbally with track maintenance forces whether they are on or off track. Those reports which are not accepted as on track are mapped to a locally referenced grid but are not displayed on the track charts.

The foregoing description has essentially described the rail vehicle positioning system of the present invention. The operation and construction of the rail vehicle positioning system of the present invention is performed by the rail vehicle tracking computer algorithm which is implemented either by ROCS 116 or TCC 102 and is individually prepared for the peculiar needs of a particular railroad customer. The purpose of the vehicle tracking algorithm is to provide a best estimate of position for all vehicles. The algorithm will accept inputs entered by dispatchers for vehicle I.D. and location, special moves definition and train length. The algorithm also accepts GPS, dead reckoning, position transponder and OS position reports from equipment on board locomotives and also accepts track vehicle type inputs.

While particular embodiments of the present invention have been shown and described, it should be clear that changes and modifications may be made to such embodiments without departing from the true scope and spirit of the invention. It is intended that the appended claims cover all such changes and modifications.

We claim:

1. A rail vehicle positioning system of the type used to provide a locomotive engineer with information relating to the position of a locomotive; said system comprising in operative combination:
   a GPS global positioning system receiver disposed on said locomotive for providing a GPS signal;
   a wheel tachometer disposed on said locomotive for providing a tachometer signal;
   means for calibrating said wheel tachometer to correct for any error by comparing said GPS signal with said tachometer signal;
   and means for generating a position, speed, direction, and acceleration signal in response to said GPS signal and said tachometer signal.

2. A system of claim 1 further comprising a transponder interrogator means disposed on said locomotive for receiving transponder signals from a transponder and supplying said transponder signal to said means for generating.

3. A system of claim 2 wherein said means for generating a position, speed, direction, and acceleration further comprises means for generating a position signal in response to said GPS, said tachometer signal and said transponder signal.

4. A system of claim 3 further comprising:
   means for displaying said position signal to the locomotive engineer.

5. A rail vehicle positioning system of the type used to generate a position report for a locomotive on an expansive rail network; the positioning system comprising in operative combination:
   a wheel tachometer onboard said locomotive for measuring the wheel rotation rate and generating a rotation rate signal;
   an onboard computer for integrating said rotation rate signal to produce a distance traveled signal;
   a GPS global positioning system receiver onboard said locomotive for generating a GPS position signal and providing said GPS position signal to said computer;
   said computer further receiving said GPS position signal and comparing said distance traveled signal with the GPS position signal so that a calibration of said wheel tachometer can be accomplished to correct for any error therein;
   whereby, a distance traveled signal can be calibrated by a GPS receiver to improve the accuracy of said distance traveled signal.

6. A system of claim 5 further comprising means for providing track occupancy reports from OS, occupancy system, track circuits to said computer.

7. A system of claim 6 further comprising means for providing switch position reports from track switches to said computer.

8. A system of claim 7 further comprising means for providing engineer observed position signals from onboard locomotive engineers to said computer.

9. A system of claim 8 further comprising means for providing a dispatcher generated position signals from a dispatcher located offboard said locomotive to said computer.

10. A system of claim 9 further providing means for providing transponder generated position signals from trackside transponders to said computer.

11. A system of claim 10 further providing means for displaying said distance traveled signal to a locomotive engineer onboard said locomotive.

* * * * *